US011409406B2

(12) United States Patent
Chakravarty (10) Patent No.: US 11,409,406 B2
(45) Date of Patent: Aug. 9, 2022

(54) USER INTERFACE FOR MOBILE DEVICE TO NAVIGATE BETWEEN COMPONENTS

(71) Applicant: Autodesk, Inc., San Rafael, CA (US)

(72) Inventor: Munindra Nath Chakravarty, Singapore (SG)

(73) Assignee: AUTODESK, INC., San Rafael, CA (US)

( * ) Notice: Subject to any disclaimer, the term of this patent is extended or adjusted under 35 U.S.C. 154(b) by 853 days.

(21) Appl. No.: 14/927,200

(22) Filed: Oct. 29, 2015

(65) Prior Publication Data

US 2016/0147414 A1 May 26, 2016

Related U.S. Application Data

(60) Provisional application No. 62/083,780, filed on Nov. 24, 2014.

(51) Int. Cl.
| | | |
|---|---|---|
| *G06F 3/0484* | (2022.01) | |
| *G06F 3/0481* | (2022.01) | |
| *G06F 3/04817* | (2022.01) | |
| *G06F 3/0488* | (2022.01) | |
| *G06F 3/0482* | (2013.01) | |
| *G06F 30/00* | (2020.01) | |
| *G06F 111/20* | (2020.01) | |

(52) U.S. Cl.
CPC ........ *G06F 3/04817* (2013.01); *G06F 3/0482* (2013.01); *G06F 3/0488* (2013.01); *G06F 30/00* (2020.01); *G06F 2111/20* (2020.01)

(58) Field of Classification Search
CPC ..................... G06F 3/04842; G06F 17/30554
See application file for complete search history.

(56) References Cited

U.S. PATENT DOCUMENTS

| | | | | |
|---|---|---|---|---|
| 8,177,551 B2* | 5/2012 | Sachdeva | ................. | A61C 7/00 433/2 |
| 2008/0062141 A1* | 3/2008 | Chandhri | .............. | G06F 3/0482 345/173 |
| 2008/0140357 A1* | 6/2008 | Bussey | ................... | G06F 17/50 703/1 |
| 2008/0188969 A1* | 8/2008 | O'Malley | ............... | G06F 17/50 700/97 |
| 2009/0226080 A1* | 9/2009 | Boyd | .................. | G06F 3/04815 382/154 |
| 2010/0037178 A1* | 2/2010 | Queric | ................ | G06F 3/04845 715/836 |
| 2010/0128007 A1* | 5/2010 | Cole | ..................... | G06F 1/1626 345/184 |
| 2010/0268513 A1* | 10/2010 | Loberg | ................ | G06F 17/5004 703/1 |

(Continued)

*Primary Examiner* — Rayeez R Chowdhury
(74) *Attorney, Agent, or Firm* — Gates & Cooper LLP (57) ABSTRACT

A method, system, apparatus, and computer program product provide the ability to navigate between components in a computer-aided design (CAD) mobile drawing application. A drawing is opened in the CAD mobile drawing application on a mobile device. A navigation panel is activated. A component is selected in the drawing. In response to the selecting, information about the selected component is displayed within the navigation panel. Via a mobile device gesture, an element of the information is selected and used as the selected element. The navigation panel is updated by displaying information about the selected element.

18 Claims, 9 Drawing Sheets

(56) References Cited

U.S. PATENT DOCUMENTS

| | | | |
|---|---|---|---|
| 2010/0279736 A1* | 11/2010 | Ruotolo | G06F 17/5095 455/557 |
| 2011/0214091 A1* | 9/2011 | Nicol | G06F 3/0482 715/838 |
| 2015/0212698 A1* | 7/2015 | East | G06F 3/04842 715/856 |
| 2015/0254373 A1* | 9/2015 | De | G06F 16/9027 707/798 |
| 2015/0278732 A1* | 10/2015 | Fiedler | G06Q 10/06312 705/7.22 |

* cited by examiner

USER INTERFACE FOR MOBILE DEVICE TO NAVIGATE BETWEEN COMPONENTS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/083,780, filed on Nov. 24, 2014, by Munindra Nath Chakravarty, entitled "User Interface for Mobile Device to Navigate Between Components,".

BACKGROUND OF THE INVENTION

1. Field of the Invention

The present invention relates generally to mobile device user interfaces, and in particular, to a method, system, apparatus, and article of manufacture for a user interface for navigating between components on a mobile device.

2. Description of the Related Art

Computer-aided design (CAD) applications provide the ability to create, modify, analyze, and/or optimize a design in a variety of fields including electrical, mechanical, engineering, architecture, construction, etc. In a CAD design, various elements/components may be modeled. Further elements/components may be related or connected to each other. For example, a wall may be connected to a ceiling (in an architectural design), furniture may relate to a room which in turn relates to a floor of a building, various ducts may be connected to each other (in an AEC [Architectural Engineering, and Construction] CAD design), electrical components may be connected to each other in an electrical CAD project, etc.

Navigating/surfing within a CAD drawing/project from one element to another element (or one reference to another reference) may be desirable (e.g., in order to follow a source signal to a destination signal, to evaluate/analyze the flow of a water/gas/air [e.g., through ducting], to evaluate the flow of a signal through electrical conduit, etc.). Desktop versions of CAD applications display information that enables navigation through a text-based table. However, such a text-based table navigation is undesirable on mobile devices having limited screen real-estate, where the table-based navigation fails to take advantage of traditional mobile device based interaction (e.g., hand gestures/taps compared to that of a desktop based device).

In view of the above, it is desirable to provide a user interface including a graphical organization and display wherein interaction with such a display is efficient, simple, and clear.

SUMMARY OF THE INVENTION

A method, apparatus, system, and user interface for mobile devices that enables users to move from reference to reference across a mobile CAD project drawing set. These references, which are information associated with a mobile CAD drawing object, are represented visually, and the human computer interaction is suited to the mobile environment. Users can navigate through information associated with a CAD drawing object, such as component tag, catalog number, wire number, item number, or a report table cell containing any of these types of values, or surf between source and destination.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
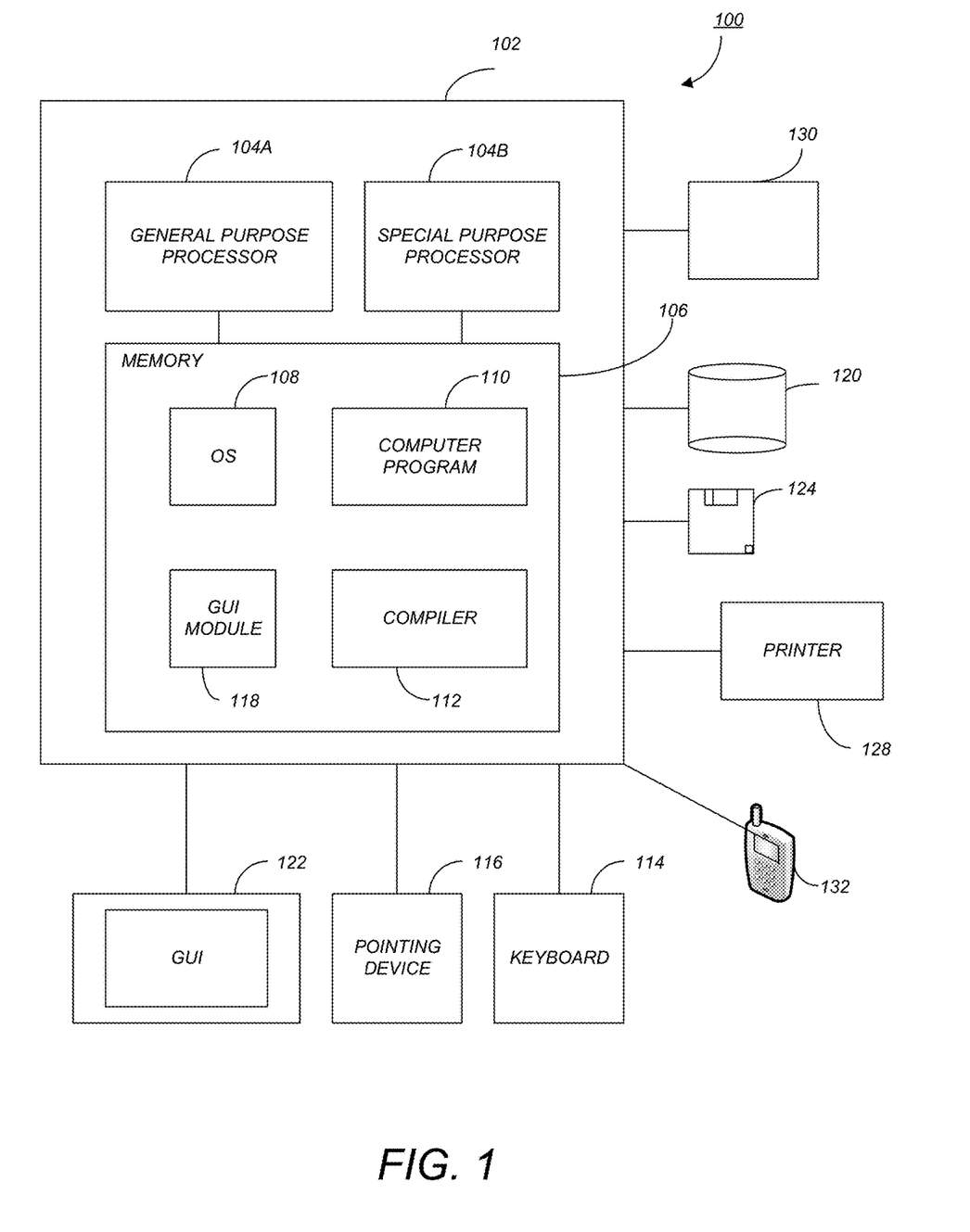
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
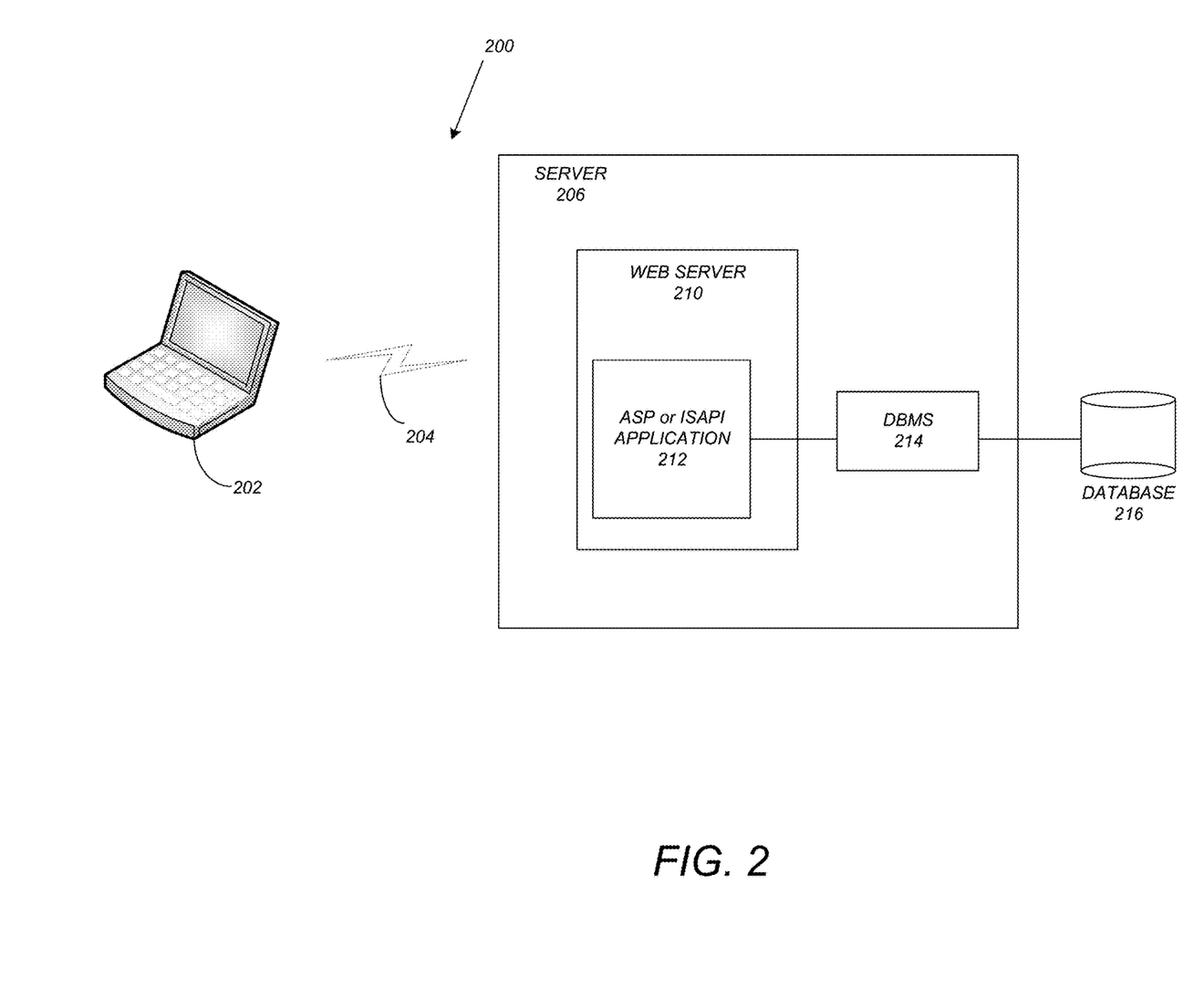
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display.

CAD applications have drawings with objects containing information that helps users to navigate between them, either inside one drawing or across a project drawing set. AUTOCAD™ ELECTRICAL™, AUTOCAD™ ARCHITECTURE™, AUTOCAD™ MEP™, AUTOCAD™ PLANT3D™ (available from the assignee of the present application) desktop applications have such navigation features between objects. Embodiments of the invention provide navigation features that are designed to suit the respective mobile application (e.g., IOS6 and IOS7 operating systems on a touch-based device such as an iPad™).

Overview of Desktop Application Navigation Dialog Boxes

In the AUTOCAD™ ELECTRICAL™ desktop application, one of the features (referred to as "SURFER™") enables users to move between related electrical components. The SURFER tool is used to search for the related references of a component, wire number, terminal, cables and signal. Using the tool, users can move from one reference to another across the drawings of a project. An electrical project drawing set would generally consist of folders containing Schematics and Panels. Schematics/schematic drawings are the wire diagrams connecting various components. Panels/panel drawings are plans of how components will be arranged in the real world (e.g., a switch box and its components). A user is likely to jump between Schematic and Panel drawings to understand the specification/position of components or jump within only Schematic drawings, only Panel drawings, or jump within the same drawing for child components.

Figure 3:
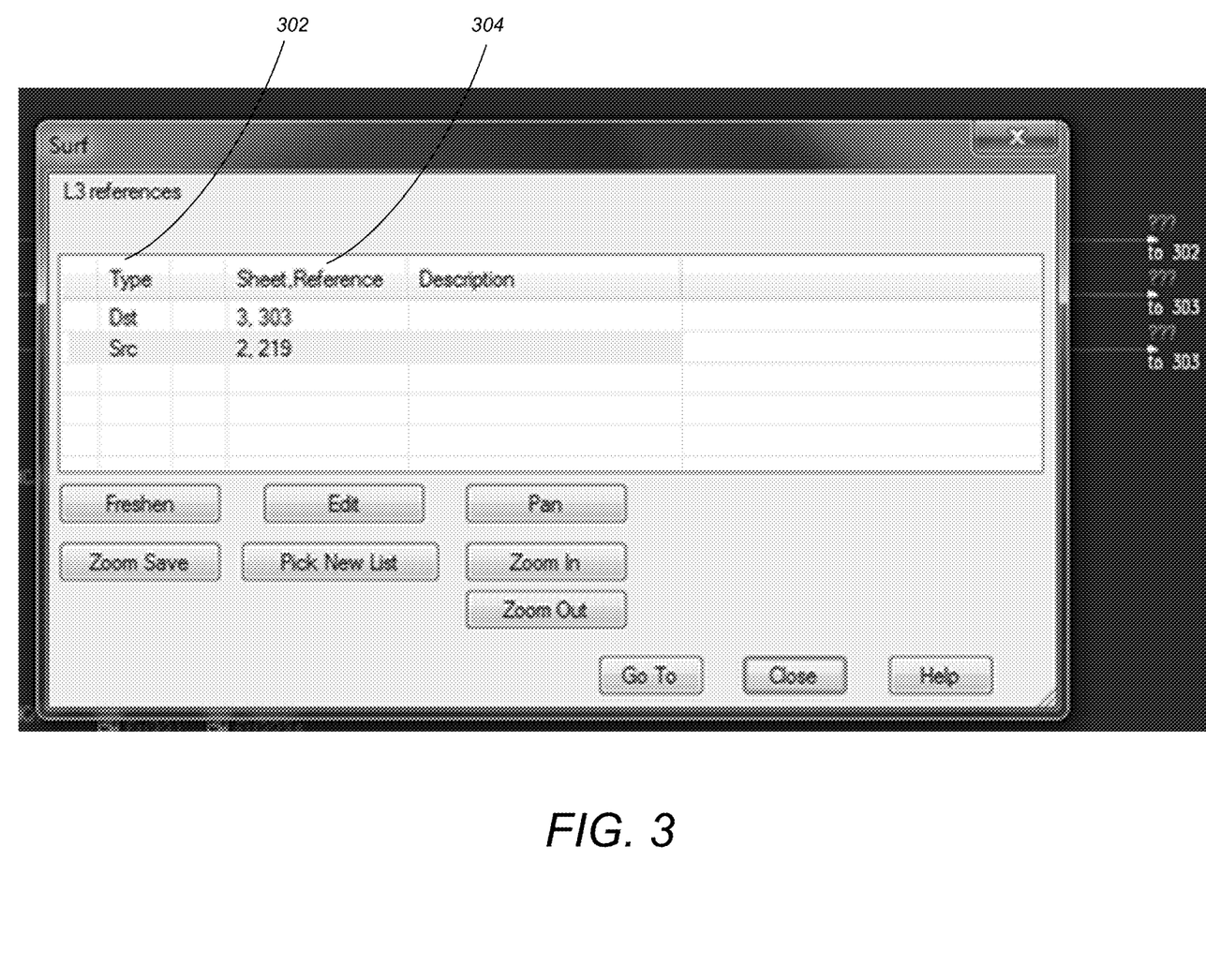
FIG. 3 illustrates the source and destination Surf dialog box in a desktop CAD application.

FIG. 3 illustrates the source and destination SURF dialog box in a desktop CAD application (to navigate between source/destination references across the drawings of a project). The type/categorization of the reference/component is illustrated in the "Type" column 302 reflecting whether a reference is for a destination (Dst) or source (Src). The Sheet.Reference column 304 provides the sheet number and line reference number of the reference/component (i.e., identification information for the drawing sheet where the reference/component can be found). Using the table-based system, the user can navigate to a destination reference/component (e.g., in FIG. 3, located in sheet number 3 with a line reference of 303).

Figure 4:
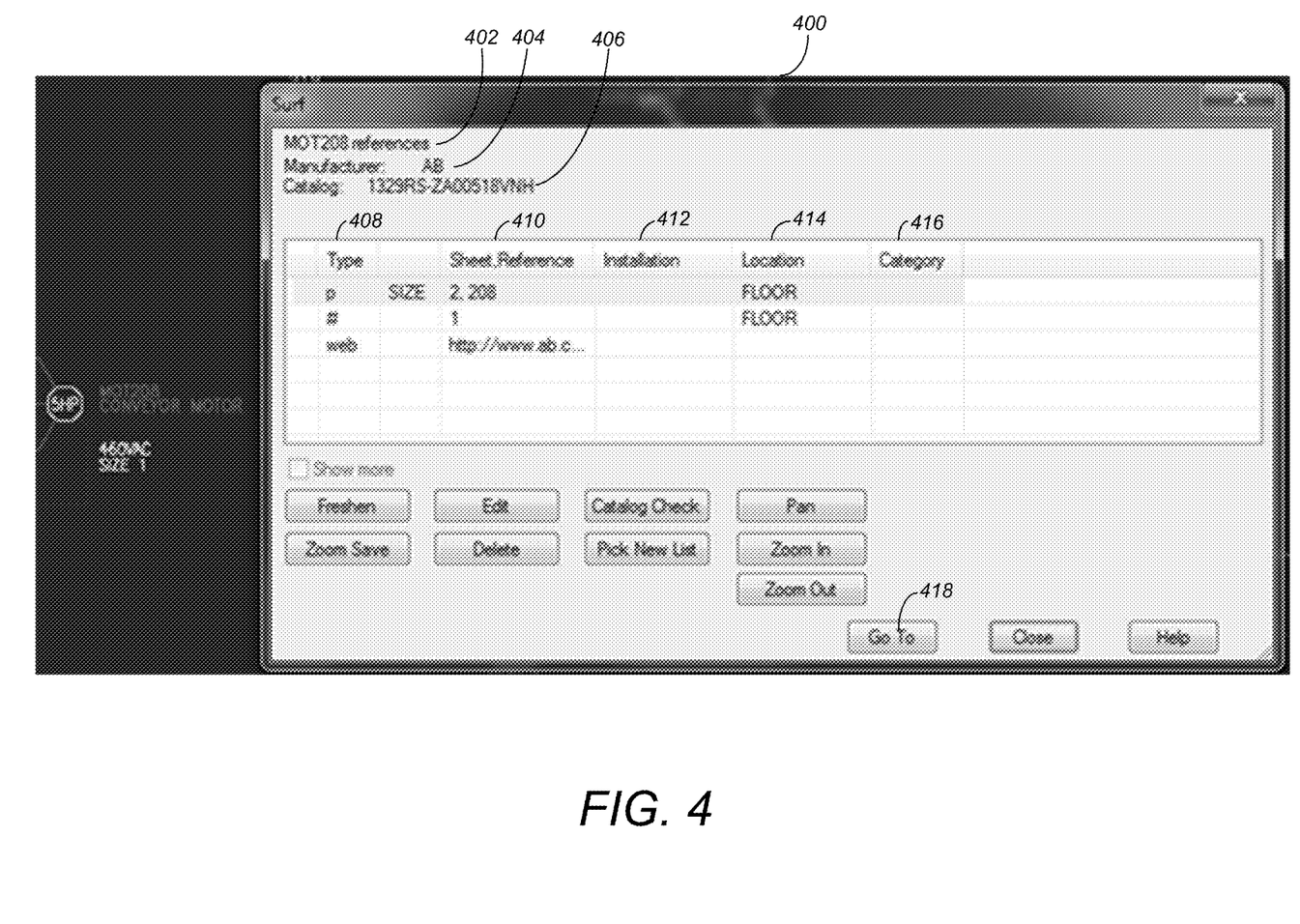
FIG. 4 illustrates a component Surf dialog box in a desktop CAD application.

FIG. 4 illustrates a component SURF dialog box in a desktop CAD application. The user can navigate to a related panel drawing using the component SURF dialog box. The dialog box 400 displays the name of the component 402, manufacturer code 404, and catalog number 406 of the selected component at the top. The different options for the component include type 408, sheet reference 410, installation 412, location 414, and category 416. The type 408 specifies different codes for different types of symbols. The codes are:

c: component symbol;
p: parent component/symbol or one-line symbol in Schematic drawing;
t: terminal symbol;
w: wire number
: panel symbol for the component footprint in the Panel drawing;
np: panel nameplate;
Dst: Destination arrow;
Src: Source arrow; and
web: Internet website address for more information on the component.

The Sheet.Reference 410 specifies the sheet number and line reference number of the component.

The installation column 412 specifies the installation value of the selected component.

The location column 414 specifies the location value of the selected component.

The category column 416 specifies the category of the selected component (e.g., "1-" in case of one-line symbols).

Accordingly, the component SURF dialog box provides a table based view of the references for a component (e.g., MOT208 references) offered by a particular manufacturer (e.g., AB) in the specified catalog (e.g., 1329RS-ZA00518VNH). Any of the listed references may be selected and various operations may be performed (e.g., using the various buttons such as Freshen, Edit, Catalog Check, Pan, Zoom Save, Delete, Pick New List, Zoom In, and Zoom Out). Further the user can select a reference and navigate to the selected reference in the CAD application (e.g., by selecting the "Go To" button 418).

Figure 5:
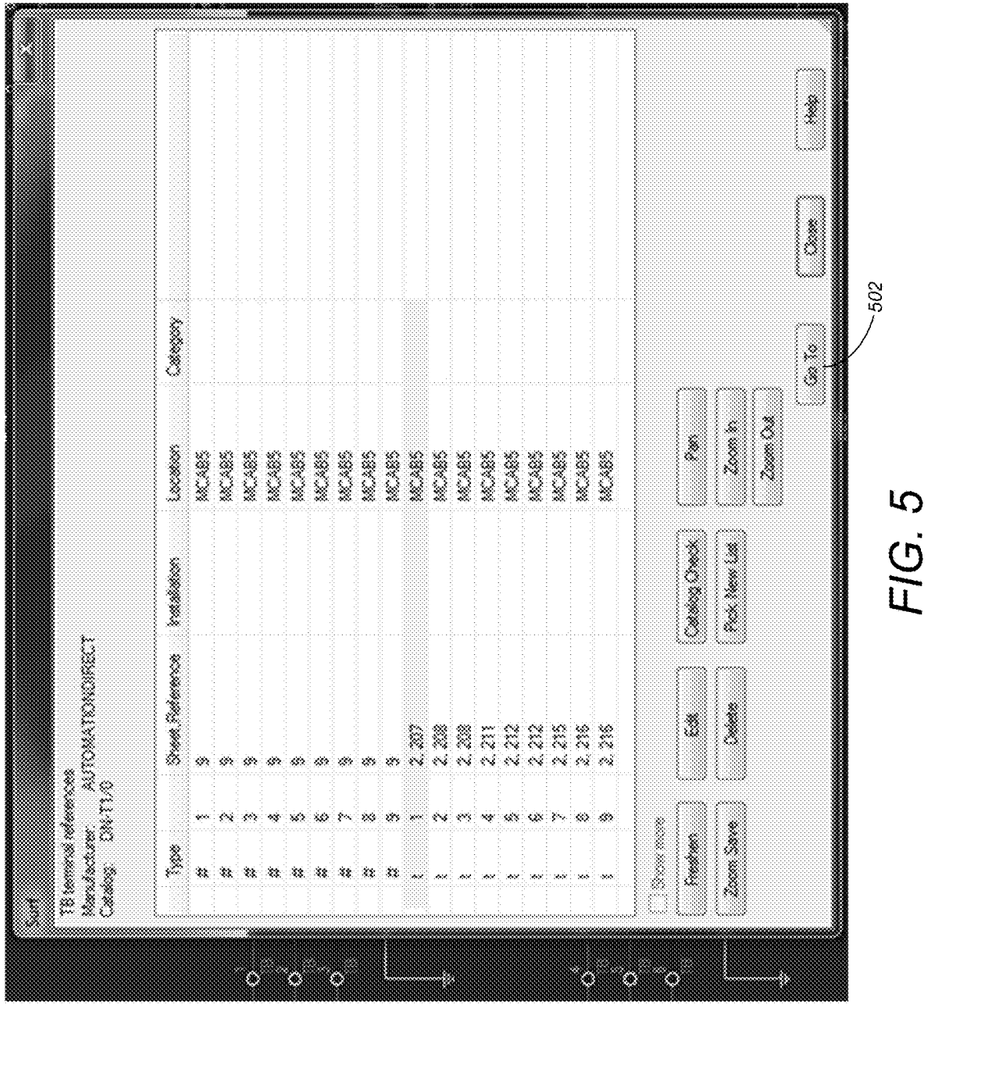
FIG. 5 illustrates a terminal Surf dialog box in a desktop CAD application.

FIG. 5 illustrates a terminal SURF dialog box in a desktop CAD application. The user can navigate to terminal references in the related panel drawing using the terminal SURF dialog box. Similar to FIG. 4, the terminal SURF dialog box provides columns for the type of reference, the sheet and reference line, the installation, the location, and the category.

The information displayed in the type column includes:

: panel symbol for the terminal footprint in Panel drawing t: terminal information in Schematic drawing Similar to the other desktop based dialog boxes, the user navigates using a table-based view by selecting the desired terminal and clicking the "Go To" button 502 (or double clicking on the selected reference.

As can be seen by FIGS. 3-5, the desktop applications displays information through a text based table that is difficult to navigate. Embodiments of the invention provide a mobile version that displays the same/similar information in a highly interactive manner.

Mobile Device Navigation Interfaces

Embodiments of the invention provide a method, system, apparatus, and user interface that will enable moving from reference to reference across mobile CAD project drawing sets, providing a visually interactive way to navigate. Based on visual icons and text displayed, users can quickly comprehend the different source/destinations, components, terminals, etc. Further, users can utilize tap and swipe gestures to navigate between such elements/references.

As an example, all information related to a component tag, catalog number, wire number, item number, or a report table cell, are visually represented and customized to suit the mobile device interactions. Relationships such as Parent, Child, counterpart components in Panel, and WWW links are all represented to suit mobile interactions—vertical swipe, horizontal swipe, tabs, and taps.

Accordingly, while the desktop version of CAD navigation displays surf information through a text based table, embodiments of the invention provide a mobile version that will display this same or similar information in a highly interactive way.

Figure 6:
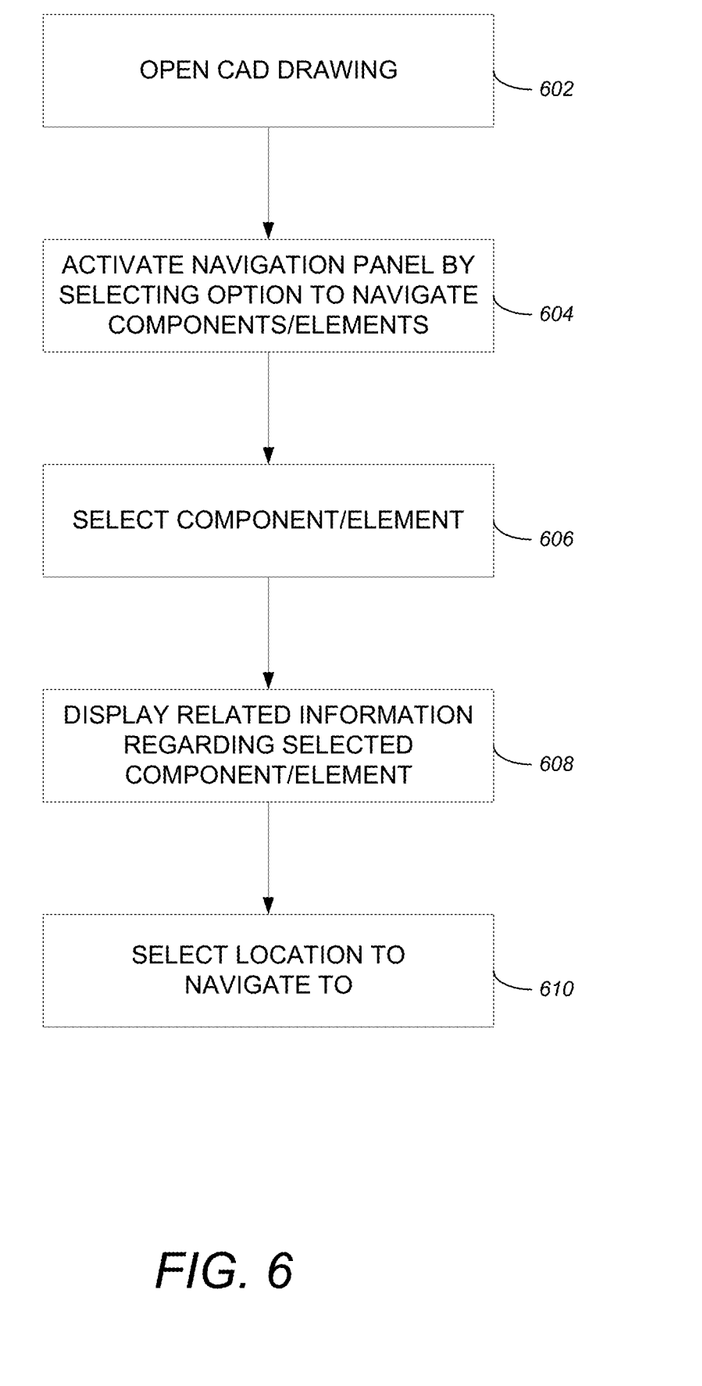
FIG. 6 is a flow chart illustrating the logical flow for navigating between components/elements in a CAD drawing in accordance with one or more embodiments of the invention.

FIG. 6 is a flow chart illustrating the logical flow for navigating between components/elements in a CAD drawing in accordance with one or more embodiments of the invention.

At step 602, a user opens a CAD drawing on a mobile device (e.g., an electrical drawing in a CAD electrical mobile application such as AUTOCAD™ ELECTRICAL MOBILE™ available from the assignee of the present invention).

At step 604, the user activates a navigation panel by selecting an option to navigate between components/elements (e.g., tapping a "Surf" icon to view a navigation (e.g., "Surf") panel).

At step 606, the user selects (e.g., via tapping) a component/element. Such a selection may be made by tapping an element in the navigation panel that is displayed. Alternatively, the component/element may be tapped in a schematic drawing view of the CAD mobile drawing application.

At step 608, in response to the selection of the component at step 606, related available information regarding the selected component/element is displayed (within the navigation panel). For example, information about the source and destination, components, terminals, etc. may be displayed. The information that is displayed may include both an icon and text to assist the user in visually and easily/readily identifying the information.

At step 610, the user selects an element/location of the information that the user desires to navigate to. In other words, the user may tap on the desired element within the information displayed where the user wants to navigate to (e.g., destination, parent, child, panel, www information, terminal, etc.). In response, in step 610, the selected location/element is utilized as the selected component and the navigation panel is updated by displaying information about the selected location.

Figure 7:
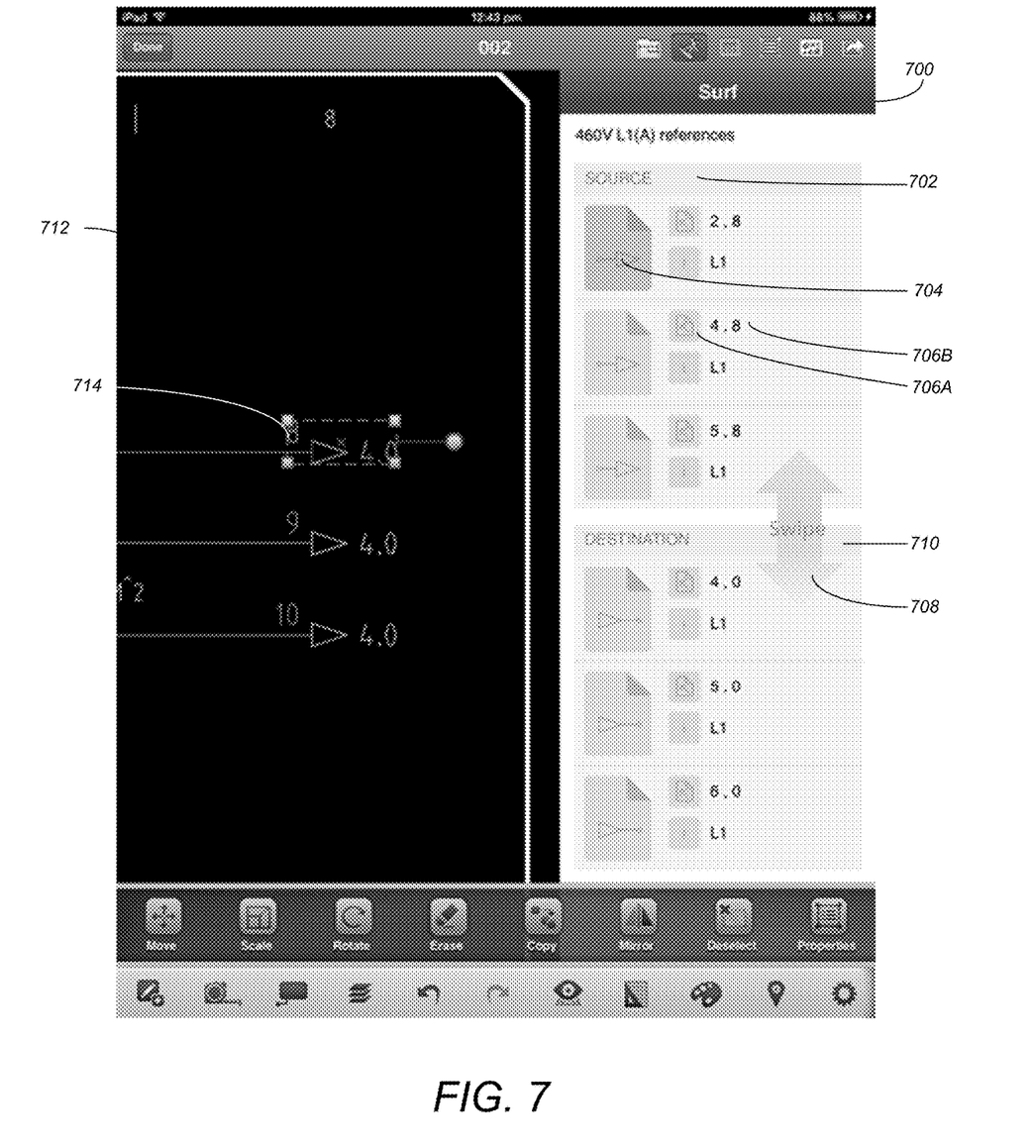
FIG. 7 illustrates a source and destination navigation panel with a selected component in accordance with one or more embodiments of the invention.

FIG. 7 illustrates a source and destination navigation panel with a selected component (i.e., subsequent to step 606 above) in accordance with one or more embodiments of the invention. In the navigation panel 700, all of the sources may be grouped under header 702. The selected source 704 may be displayed in a visually distinguishable manner (e.g., highlighted in green). The related information 706 is represented by icons 706A and text 706B. Users may understand the information by the icon 706A along with the textual information 706B simultaneously displayed. The icon 706A and text 706B together represent the information 706. In addition, the user may utilize a swipe gesture 708 to navigate to a different portion of panel 700 (e.g., to move from source area 702 to destination area 710. Also of note is that the selected component/element 704 is displayed in a visually distinguishable manner in both navigation panel 700 as well as the drawing area itself 712 (e.g., via a dotted/colored selection box 714). In this regard, the component may be selected by the user either in panel 700 or in the drawing 712.

Figure 8:
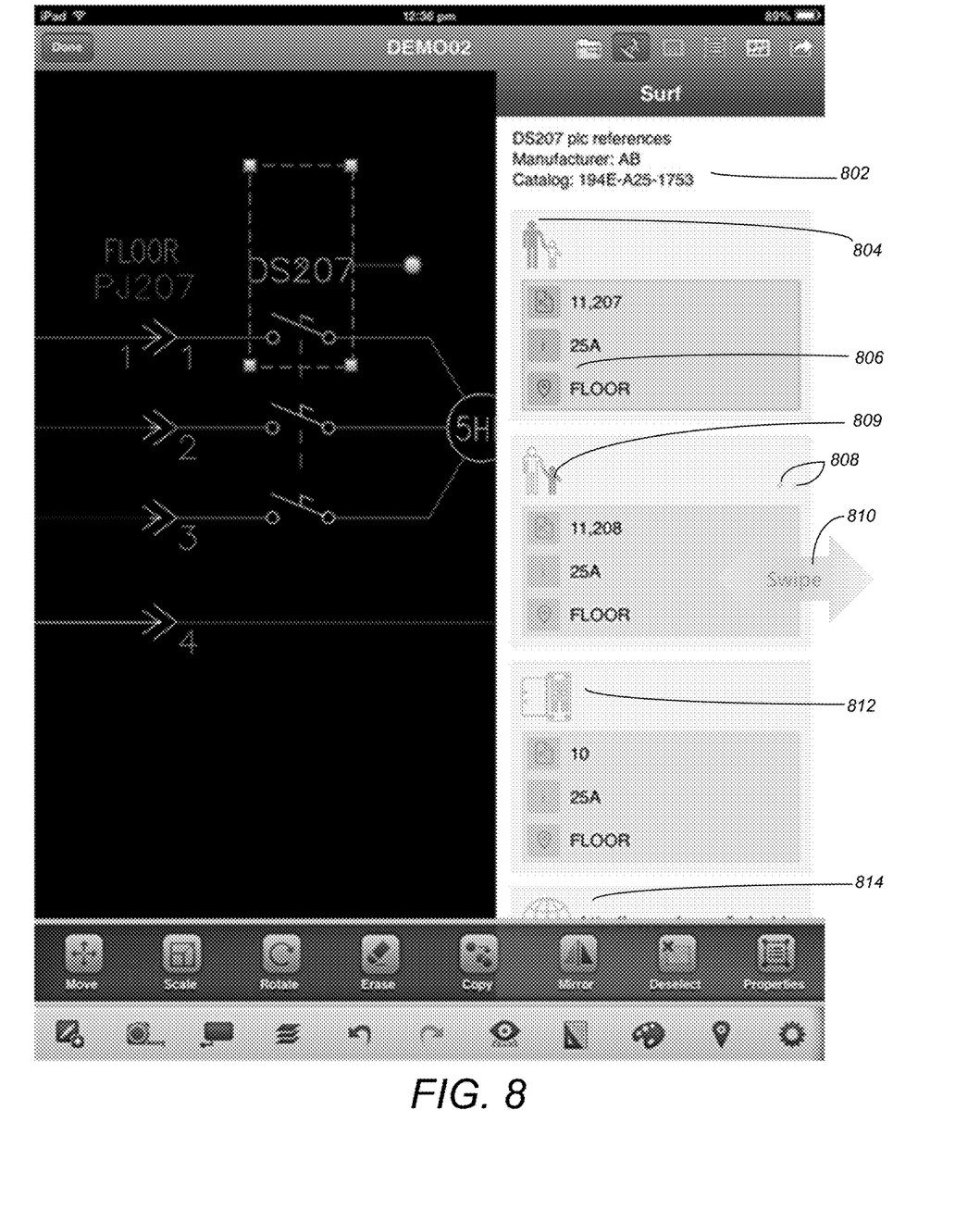
FIG. 8 illustrates a component navigation panel with a selected component in accordance with one or more embodiments of the invention.

FIG. 8 illustrates a component navigation panel with a selected component in accordance with one or more embodiments of the invention. The name and details of the selected component are displayed in area 802. In the example illustrated, the different components may be related to each other hierarchically (e.g., via parent-child type relationships). Further, different areas of the navigation panel may be used display different components. A first area may display the selected component. As illustrated, the selected component is a parent 804 that is denoted in a visually distinguishable manner (e.g., a green highlighted parent). The related information 806 is represented by icons. Similar to FIG. 7, users understand the information by the icon along with the textual information. The icon and text together represent the information. A second area may be a child component area displaying information about one of the child components of the selected parent component. There are multiple children for the selected parent, where each child may be denoted by pagination circles 808. Further, an icon may be displayed that identifies a particular component as a child component of the selected parent component (e.g., an image 809 of a child that has dark fill). The other children data can be accessed by a horizontal swipe 810 on the screen. The panel information corresponding to the selected component is displayed in area 812. Additionally, WWW internet information corresponding to the selected component may be displayed in area 814.

Figure 9:
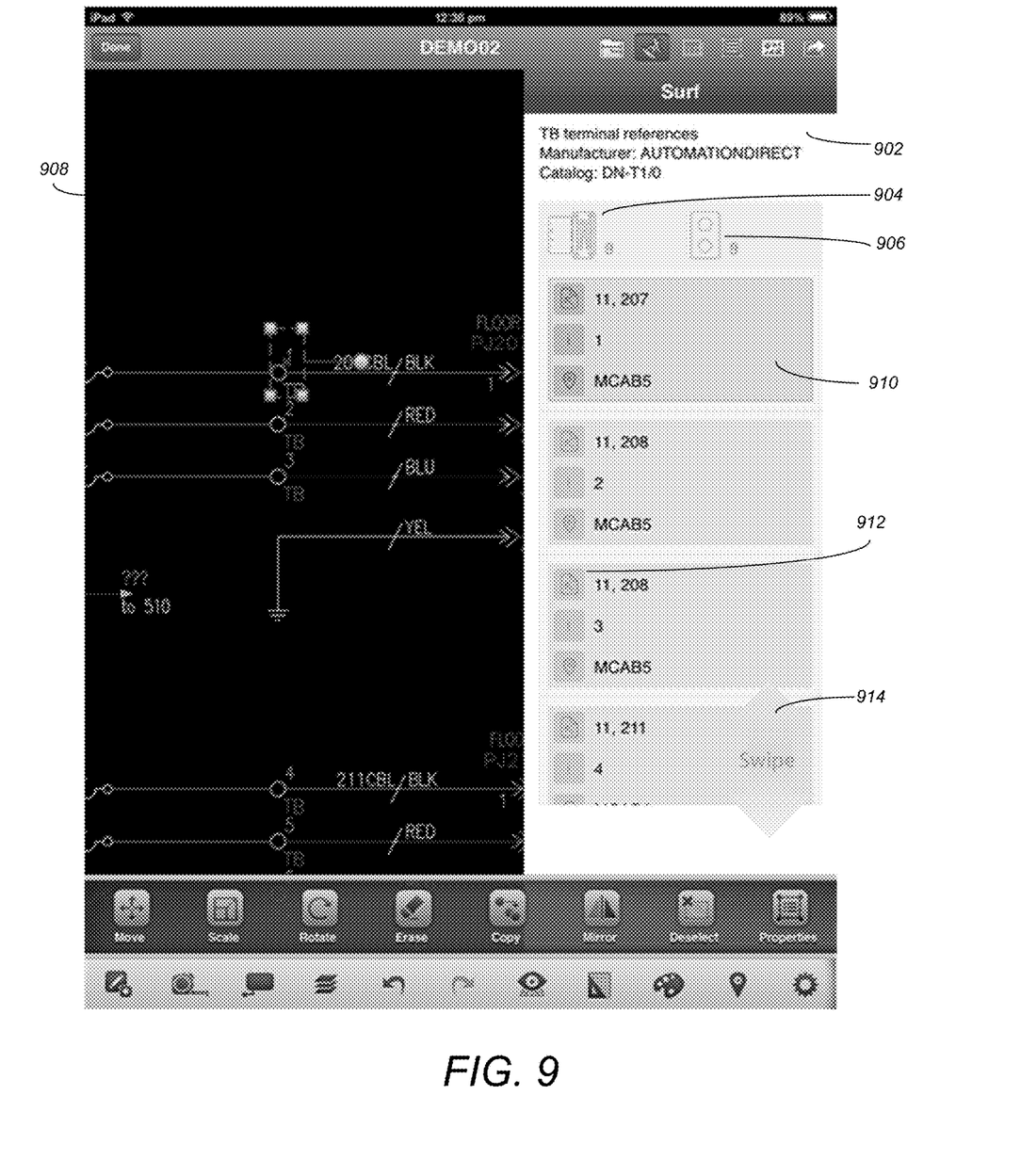
FIG. 9 illustrates a terminal navigation panel in accordance with one or more embodiments of the invention.

FIG. 9 illustrates a terminal navigation panel in accordance with one or more embodiments of the invention. The name and details of the selected terminal are set forth in area 902. There are two tabs to the terminal navigation panel, the panel tab 904 and the terminal tab 906. The selected component is in the schematics drawing 908, and accordingly, the terminal tab 906 may be displayed in a visually distinguishable manner (e.g., highlighted in green) while the panel tab 904 may be displayed in a different manner (e.g., in grey). Further, information about the selected component may be displayed within a box 910 that appears in a visually distinguishable manner (e.g., a green highlighted box) (e.g., the same color as the highlighted icon 906). The related information 912 is represented by icons. Users understand the information by the icon along with the textual information (the icon and text together represent the information). The user can view further related information by vertically swiping the screen 914.

To navigate to a related component (i.e., of a selected component) in any of FIGS. 7-9, the user simply selects the information corresponding to the selected component. Further to the above, the user may tap and hold over any item of information. Such a tap and hold (in contrast to a tap and release which actually selects the corresponding component), will temporarily highlight (and or display in a visually distinguishable manner [e.g., different color, flashing, display a bounding box, zoom in and out on the component, etc.]) the corresponding component/element in the CAD drawing area. Thus, the user can identify and confirm a selected component prior to actually selecting the component using the navigation panels. Further to the above, while FIGS. 7-9 are specific to electrical based mobile applications, such navigation features and capabilities can apply equally to all other mobile CAD applications that have a navigation feature between CAD drawing objects, either inside one drawing or across a drawing project set.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for navigating between components in a computer-aided design (CAD) mobile drawing application, comprising:
    opening a drawing in a schematic drawing view in the CAD mobile drawing application on a mobile device, wherein:
        the mobile device comprises a handheld mobile device comprising a touch screen;
        the drawing comprises multiple components;
        the CAD mobile drawing application is different from a desktop CAD application;
        screen real estate on the touch screen of the mobile device is limited relative to a desktop based device; and
        the CAD mobile drawing application takes advantage of mobile device based interaction and the screen real estate of the mobile device via mobile device hand gestures on the touch screen;
    activating a navigation panel of the CAD mobile drawing application on the touch screen of the mobile device, wherein:
        the navigation panel enables navigation between the components of the drawing via mobile device hand gestures;
        the navigation panel displays information about a selected component; and
        the navigation panel is a different panel from the schematic drawing view;
    selecting one of the components of the drawing in the schematic drawing view;
    in response to the selecting, displaying, within the navigation panel on the touch screen, information about the selected component, wherein the information is displayed using an icon and text within the navigation panel;
    selecting within the navigation panel, via the mobile device hand gesture on the touch screen, an element of the information;
    utilizing the selected element as the selected component; and
    updating the navigation panel by displaying information about the selected element.

2. The computer-implemented method of claim 1, wherein the activating comprises:
    tapping an icon corresponding to a navigation panel.

3. The computer-implemented method of claim 1, wherein the selecting the component in the drawing comprises:
    tapping the component in the schematic drawing view of the CAD mobile drawing application.

4. The computer-implemented method of claim 1, wherein the selecting an element of the information comprises:
    tapping on the element within the navigation panel.

5. The computer-implemented method of claim 1, wherein the navigation panel comprises a source and destination navigation panel, the method further comprising:
    receiving a vertical swipe gesture in the navigation panel;
    in response to the vertical swipe gesture, navigating within the navigation panel from a source area to a destination area.

6. The computer-implemented method of claim 1, wherein:
    the navigation panel comprises a component navigation panel;
    the selected component is a parent component of one or more related child components;
    a first area of the component navigation panel comprises a parent component area displaying information about the selected parent component, and a parent visual identification that visually identifies the selected component as a parent component;
    a second area of the component navigation panel comprises a child component area displaying information about one child component of the selected parent component, and a child visual identification that visually identifies the child component as a child component.

7. The computer-implemented method of claim 6, wherein the method further comprises:
    receiving a horizontal swipe gesture adjacent to the child component area;
    in response to the horizontal swipe gesture, navigating to additional children components of a selected parent component.

8. The computer-implemented method of claim 1, wherein:
    the selected component is displayed in a visually distinguishable manner in the navigation panel.

9. A mobile apparatus for navigating between components in a computer-aided design (CAD) mobile drawing application, comprising:
 (a) a mobile device comprising a multi-touch device comprising a touch screen, wherein:
  (1) the mobile device comprises a handheld mobile device;
  (2) a drawing comprises multiple components;
  (3) the CAD mobile drawing application is different from a desktop CAD application;
  (4) screen real estate on the touch screen of the mobile device is limited relative to a desktop based device; and
  (5) the CAD mobile drawing application takes advantage of mobile device based interaction and the screen real estate of the mobile device via mobile device hand gestures on the touch screen;
 (b) the CAD mobile drawing application executing on the mobile device, wherein the CAD mobile drawing application is configured to:
  (1) open the drawing in a schematic drawing view;
  (2) activate a navigation panel of the CAD mobile drawing application on the touch screen of the mobile device, wherein:
   (A) the navigation panel enables navigation between the components of the drawing via mobile device hand gestures;
   (B) the navigation panel displays information about a selected component; and
   (C) the navigation panel is a different panel from the schematic drawing view;
  (3) select one of the components of the drawing in the schematic drawing view;
  (4) in response to the selection, display, within the navigation panel on the touch screen, information about the selected component, wherein the information is displayed using an icon and text within the navigation panel;
  (5) select, within the navigation panel, via the mobile device hand gesture on the touch screen, an element of the information;
  (6) utilize the selected element as the selected component; and
  (7) update the navigation panel by displaying information about the selected element.

10. The mobile apparatus of claim 9, wherein the activation of the navigation panel comprises:
 tapping an icon corresponding to a navigation panel.

11. The mobile apparatus of claim 9, wherein the selection of the component in the drawing comprises:
 tapping the component in the schematic drawing view of the CAD mobile drawing application.

12. The mobile apparatus of claim 9, wherein the selection of an element of the information comprises:
 tapping on the element within the navigation panel.

13. The mobile apparatus of claim 9, wherein the navigation panel comprises a source and destination navigation panel, and the CAD mobile drawing application is further configured to:
 receive a vertical swipe gesture in the navigation panel;
 in response to the vertical swipe gesture, navigate within the navigation panel from a source area to a destination area.

14. The mobile apparatus of claim 9, wherein:
 the navigation panel comprises a component navigation panel;
 the selected component is a parent component of one or more related child components;
 a first area of the component navigation panel comprises a parent component area displaying information about the selected parent component, and a parent visual identification that visually identifies the selected component as a parent component;
 a second area of the component navigation panel comprises a child component area displaying information about one child component of the selected parent component, and a child visual identification that visually identifies the child component as a child component.

15. The mobile apparatus of claim 14, wherein the CAD mobile drawing application is further configured to:
 receive a horizontal swipe gesture adjacent to the child component area;
 in response to the horizontal swipe gesture, navigate to additional children components of a selected parent component.

16. The mobile apparatus of claim 9, wherein:
 the selected component is displayed in a visually distinguishable manner in the navigation panel.

17. The method of claim 1 wherein the handheld mobile device comprises a cellular handheld mobile device.

18. The mobile apparatus of claim 9, wherein the handheld mobile device comprises a cellular handheld mobile device.

\* \* \* \* \*